(12) United States Patent
Ouyang et al.

(10) Patent No.: US 10,151,963 B2
(45) Date of Patent: Dec. 11, 2018

(54) PHOTONIC CRYSTAL ALL-OPTICAL D-TYPE FLIP-FLOP

(71) Applicant: Zhengbiao Ouyang, Shenzhen, Guangdong (CN)

(72) Inventors: Zhengbiao Ouyang, Guangdong (CN); Quanqiang Yu, Guangdong (CN)

(73) Assignee: Zhengbiao Ouyang, Shenzhen (CN)

( * ) Notice: Subject to any disclaimer, the term of this patent is extended or adjusted under 35 U.S.C. 154(b) by 45 days.

(21) Appl. No.: 15/626,206

(22) Filed: Jun. 19, 2017

(65) Prior Publication Data

US 2017/0285441 A1    Oct. 5, 2017

Related U.S. Application Data

(63) Continuation of application No. PCT/CN2015/097847, filed on Dec. 18, 2015.

(30) Foreign Application Priority Data

Dec. 19, 2014  (CN) .......................... 2014 1 0799752

(51) Int. Cl.
*G02F 3/00* (2006.01)
*G02F 1/35* (2006.01)
*G02F 1/365* (2006.01)
*G02B 6/35* (2006.01)
*G02B 6/122* (2006.01)

(52) U.S. Cl.
CPC ............. *G02F 3/00* (2013.01); *G02B 6/1225* (2013.01); *G02B 6/3544* (2013.01); *G02F 1/3511* (2013.01); *G02F 1/365* (2013.01); *G02F 2201/06* (2013.01); *G02F 2202/32* (2013.01)

(58) Field of Classification Search
CPC .................. G02B 6/1225; G02B 6/125; G02B 2006/1213; G02F 1/365; G02F 1/0126; G02F 3/00; G02F 3/02; G02F 2/004; B82Y 20/00
USPC ...... 359/108, 243, 244; 385/17, 31; 398/141
See application file for complete search history.

(56) References Cited

U.S. PATENT DOCUMENTS

| 7,409,131 B2 * | 8/2008 | Covey | G02F 3/024 359/108 |
| 2005/0163419 A1 * | 7/2005 | Scherer | G02F 1/0126 385/16 |

* cited by examiner

*Primary Examiner* — Collin X Beatty

(57) ABSTRACT

A photonic crystal all-optical D-type flip-flop includes an optical switch unit, a photonic crystal structure unit including two signal-input ends, a signal-output end and an idle port, a wave absorbing load and a reference-light source; the clock signal-input port of the photonic crystal structure unit is connected with a clock control signal; a second port of the photonic crystal structure unit is an intermediate signal-input port, said intermediate signal-input end of the photonic crystal structure unit is connected with a first intermediate signal-output end of the optical selector switch; a logic signal is connected with the first signal-input end of the optical switch unit; the absorbing load is connected with a second intermediate signal-output end of the optical switch unit; said reference-light source is connected with a second signal-input end of the optical switch unit, which is a reference-light input end connecting with the output end of said reference-light source.

10 Claims, 5 Drawing Sheets

| A | B | C | Y |
|---|---|---|---|
| 0 | 0 | 0 | 0 |
| 0 | 0 | 1 | 0 |
| 0 | 1 | 0 | 0 |
| 0 | 1 | 1 | 1 |
| 1 | 0 | 0 | 0 |
| 1 | 0 | 1 | 0 |
| 1 | 1 | 0 | 1 |
| 1 | 1 | 1 | 1 |

FIG. 5

PHOTONIC CRYSTAL ALL-OPTICAL D-TYPE FLIP-FLOP

CROSS-REFERENCE TO RELATED APPLICATION

This application is a continuation application of PCT Application No. PCT/CN2015/097847 filed on Dec. 18, 2015, which claims priority to Chinese Patent Application No. 201410799752.9 filed on Dec. 19, 2014, the entire contents of which are hereby incorporated by reference.

FIELD OF THE INVENTION

The present invention relates to a two-dimensional (2D) photonic crystal (PhC) and optical D-type flip-flop.

BACKGROUND OF THE INVENTION

In 1987, the concept of PhC was proposed separately by E. Yablonovitch from United States Bell Labs who discussed how to suppress spontaneous radiation and by S. John from Princeton University who made discussions about photonic localization. A PhC is a material structure in which dielectric materials are arranged periodically in space, and is usually an artificial crystal including of two or more materials having different dielectric constants.

With the emergence of and in-depth research on PhC, people can control the motion of photons in a PhC material more flexibly and effectively. In combination with traditional semiconductor processes and integrated circuit technologies, design and manufacture of PhC and devices thereof have continually and rapidly marched towards all-optical processing, and PhC has become a breakthrough for photonic integration. In December 1999, PhC was recognized by the American influential magazine *Science* as one of the top-ten scientific advances in 1999, and therefore has become a hot topic in today's scientific research field.

An all-optical logic device mainly includes an optical amplifier-based logic device, a nonlinear loop mirror logic device, a Sagnac interference-type logic device, a ring cavity logic device, a multi-mode interference logic device, an optical waveguide coupled logic device, a photoisomerized logic device, a polarization switch optical logic device, a transmission grating optical logic device, etc. These optical logic devices have the common shortcoming of large size in developing large-scale integrated optical circuits. With the improvement of science and technology in recent years, people have also done research and developed quantum optical logic devices, nano material optical logic devices and PhC optical logic devices, which all conform to the dimensional requirement of large-scale photonic integrated optical circuit. For modern manufacturing processes, however, the quantum optical logic devices and the nanomaterial optical logic devices are very difficult to be manufactured, whereas the PhC optical logic devices have competitive advantages in terms of manufacturing process.

In recent years, PhC logic devices have become a hot area of research drawing widespread attentions, and it is highly likely for them to replace the current widely-applied electronic logic devices in the near future.

In the process of realizing all-optical computing, PhC logical function devices based on "AND", "OR", "NOT", "XOR" and the like have been successfully designed and researched, and various complex logic components are still needed for achieving the goal of all-optical computing.

SUMMARY OF THE INVENTION

The present invention is aimed at overcoming the defects of the prior art and providing a PhC all-optical D-type flip-flop which is simple in structure, strong in anti-interference capability and easy to integrate with other optical logic elements.

In order to solve the above technical problems, the present invention adopts the following technical solution:

A PhC all-optical D-type flip-flop, wherein said PhC all-optical D-type flip-flop, comprising an optical switch unit, a PhC structure unit, a wave absorbing load and a reference-light source; the PhC structure unit includes two signal-input ports, a signal-output port and an idle port; a first port of the PhC structure unit is a clock-signal input port, and the clock-signal input port is connected with a clock control signal CP; a second port of the PhC structure unit is an intermediate signal-input port, the intermediate signal-input port is connected with a first intermediate signal-output port of the optical selector switch; a logic signal D is connected with the first signal-input port of the optical switch unit; the absorbing load is connected with a second intermediate signal-output port of the optical switch unit; the reference-light source is connected with a second signal-input port of the optical switch unit; the second signal-input port is a reference-light input port, the reference-light input port is connected with the output port of the reference-light source.

The PhC structure unit is a 2D PhC nonlinear cavity, and a center of the 2D PhC cross-waveguide nonlinear cavity is formed by arranging twelve rectangular high-refractive-index linear-dielectric pillars and one square nonlinear-dielectric pillar in a quasi-one-dimensional (1D) PhC manner in a longitudinal waveguide direction and a transverse waveguide direction, the central square nonlinear-dielectric pillar attaches to a four adjacent rectangular linear-dielectric pillars, the central square nonlinear-dielectric pillar is made of a Kerr type nonlinear material, and has a dielectric constant of 7.9 under low-light-power conditions, a second rectangular high-refractive-index linear-dielectric pillar has said dielectric constant consistent with that of the nonlinear-dielectric pillar under low-light-power conditions.

The high-refractive-index linear-dielectric pillars of said nonlinear cavity unit includes a 2D PhC cross intersected waveguide four-port network, two mutually-orthogonal quasi-1D PhC structures are placed in two waveguide directions crossed at the center of across waveguide, the dielectric pillar is arranged in a middle of said cross waveguide, the dielectric pillar is made of a nonlinear material, and the quasi-1D PhC structures and the dielectric pillar constitute a waveguide defect cavity.

The PhC is a (2k+1)×(2k+1) array structure, where k is an integer more than or equal to 3.

The optical switch unit is a 2×2 optical selector switch, and included of a clock control signal CP, a first signal-input port, a second signal-input port, a first intermediate signal-output port and a second intermediate signal-output port; said first signal-input port is system signal-input port; the second signal-input port is reference-light input port.

A cross section of the high-refractive-index linear-dielectric pillar of the 2D PhC is circular, elliptic, triangular or polygonal.

The dielectric pillar in the quasi-1D PhC of the cross waveguide has a refractive index of 3.4 or a different value more than 2.

The cross section of the central dielectric pillar is square, polygonal, circular or elliptic.

The cross section of the dielectric pillar in the quasi-1D PhC of said cross waveguide is rectangular, polygonal circular or elliptic.

A background filling material for said 2D PhC includes air or a different low-refractive-index dielectric having a refractive index less than 1.4.

The PhC all-optical D-type flip-flop of the present invention can be widely applied in the field of electronics. Compared with the prior art, the PhC all-optical D-type flip-flop has the following advantages.

1. The all-optical synchronous D-type flip-flop is compact in structure, high in high and low logic output contrast, quick in response and easy to integrate with other optical logic elements.

2. The PhC logic device can directly carry out all-optical logic functions of "AND", "OR", "NOT" and the like, is a core device for realizing all-optical computing, and is compact in structure, strong in anti-interference capability and high in computing speed.

3. The D-type flip-flop is also referred to as a maintaining-blocking edge D-type flip-flop, can reduce the interference to an electronic circuit and enhance the reliability of the circuit, and is high in frequency.

These and other objects and advantages of the present invention will become readily apparent to those skilled in the art upon reading the following detailed description and claims and by referring to the accompanying drawings.

BRIEF DESCRIPTION OF THE DRAWINGS

In FIG. 1, indications are: optical switch unit 01, first signal-input port 11, second signal-input port 12, first intermediate signal-output port 13, second intermediate signal-output port 14, PhC structure unit 02, clock-signal input port 21, intermediate signal-input port 22, idle port 23, output port 24, circular high-refractive-index linear-dielectric pillar 25, first rectangular high-refractive-index linear-dielectric pillar 26, second rectangular high-refractive-index linear-dielectric pillar 27, central nonlinear-dielectric pillar 28, absorbing load 03, clock control signal CP, reference-light source 04, reference-light E, logic signal D.

FIG. 5 is a truth table of logic functions of the 2D PhC cross-waveguide nonlinear cavity shown in FIG. 1.

DETAILED DESCRIPTION OF THE EMBODIMENTS

Figure 1:
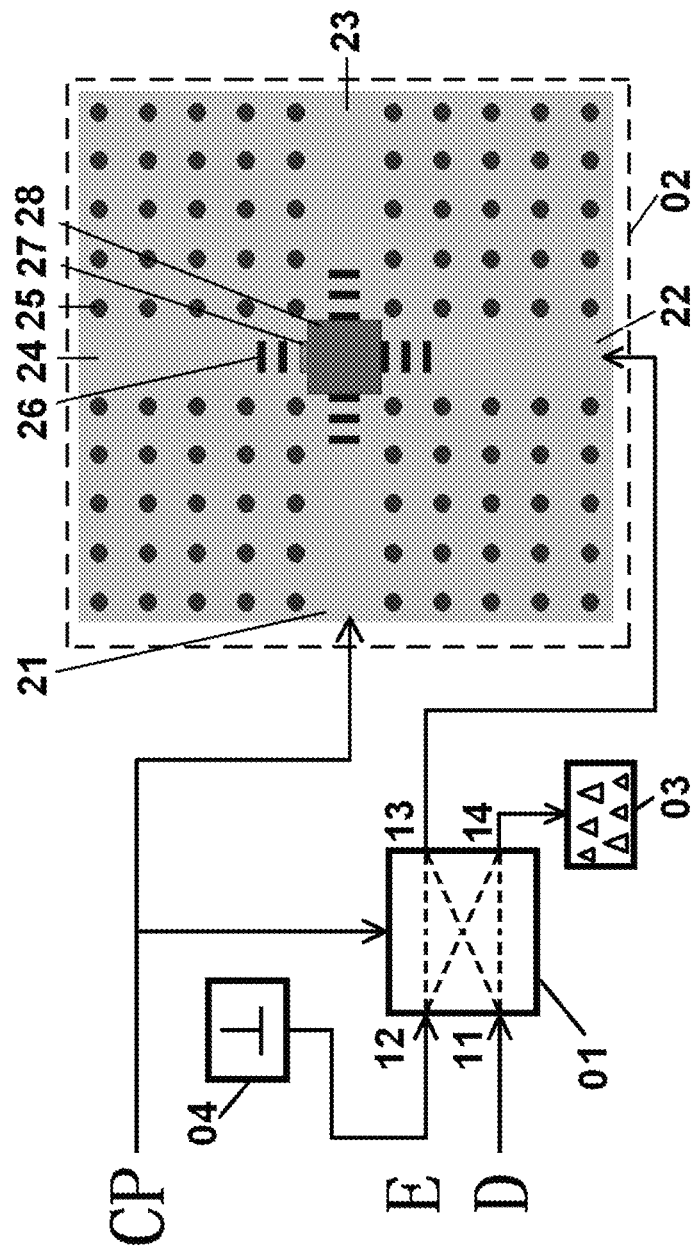
FIG. 1 shows a structural diagram of a PhC all-optical D-type flip-flop of the present invention.

Referring to FIG. 1, a PhC all-optical D-type flip-flop of the present invention includes an optical switch unit 01, a PhC structure unit 02, an internal or external wave absorbing load 03 and an internal or external reference-light source 04; the optical switch unit 01 includes a first signal-input port 11, a second signal-input port 12, a first intermediate signal-output port 13 and a second intermediate signal-output port 14; the optical switch unit 01 is a 2×2 optical selector switch controlled by a clock signal CP, and is used for controlling and selecting a certain logic signal for outputting and serving as the input of next stage of PhC structure unit; the first signal-input port 11 of the optical switch unit 01 inputs a logic signal D, the logic signal D is connected with the first signal-input port 11 of the optical switch unit 01, the internal or external reference-light source 04 outputs reference-light E, E=1, the reference-light source 04 is connected with the reference-light E, the output reference-light E is connected with the second signal-input port 12 of the optical selector switch, the second signal-input port 12 is a reference-light input port, the reference-light input port is connected with the output port of the internal or external reference-light source 04, i.e., the second signal-input port 12 is connected with the reference-light source 04, the first intermediate signal-output port 13 is connected with the intermediate signal-input port 22 of the PhC structure unit 02, the second signal-output port 14 is connected with the wave absorbing load 03, and the wave absorbing load 03 is used for absorbing light wave entering it; the clock control signal CP is connected to the input port of a two-branch waveguide, one output port of the two-branch waveguide is connected with the clock-signal control port of the optical selector switch 01, and the other output port of the two-branch waveguide is connected with the clock-signal input port 21 of the PhC structure unit 02; the PhC structure unit 02 includes two signal-input ports, a signal-output port and an idle port; the first port of the PhC structure unit 02 is a clock-signal input port 21, and the clock-signal input port 21 is connected with a clock control signal CP; the second port of the PhC structure unit 02 is an intermediate signal-input port 22, the intermediate signal-input port 22 is connected with the first intermediate signal-output port 13 of the optical selector switch; and the clock control signal CP is used for controlling the reference-light E and the logic signal D to be output from the first intermediate signal-output port 13 or the second intermediate signal-output port 14 of the optical switch unit 01. The PhC structure unit 02 is a 2D PhC nonlinear cavity, and set logic functions can be realized according to self-logic operation characteristic of the 2D PhC nonlinear cavity and mutual cooperation of said unit devices. The center of the 2D PhC cross-waveguide nonlinear cavity is formed by arranging twelve rectangular high-refractive-index linear-dielectric pillars and one square nonlinear-dielectric pillar in a quasi-1D PhC manner in the longitudinal waveguide direction and the transverse waveguide direction, the central square nonlinear-dielectric pillar attaches to the four adjacent rectangular linear-dielectric pillars, the high-refractive-index linear-dielectric pillars are constituted by a 2D PhC cross-waveguide four-port network, and two mutually-orthogonal quasi-1D PhC structures are placed crossed at the center of the cross waveguide in the two waveguide directions; a dielectric pillar is arranged in the middle of the cross waveguide, and the dielectric pillar is made of a nonlinear material; the quasi-1D PhC structures and the dielectric pillar constitute a waveguide defect cavity. The lattice constant of the 2D PhC array is d, and the array number is 11×11.

The present invention based on the photonic bandgap characteristic, quasi-1D PhC defect state, tunneling effect and optical Kerr nonlinear effect of the 2D PhC cross-waveguide nonlinear cavity shown by 01 of FIG. 1, the function of the PhC all-optical synchronous D-type flip-flop can be realized by the optical switch and cooperation of the unit devices. Introduced first is the basic principle of the PhC nonlinear cavity in the present invention: a 2D PhC provides a photonic bandgap with certain bandwidth, a light wave with its wavelength falling into this bandgap can be propagated in an optical circuit designed inside the PhC, and the operating wavelength of the device is thus set to certain wavelength in the photonic bandgap; the quasi-1D PhC structure arranged in the center of the cross waveguide and the nonlinear effect of the central nonlinear-dielectric pillar together provide a defect state mode, which, as the input light wave reaches a certain light intensity, shifts to the operating frequency of the system, so that the structure produces the tunneling effect and signals are output from the output port.

Figure 2:
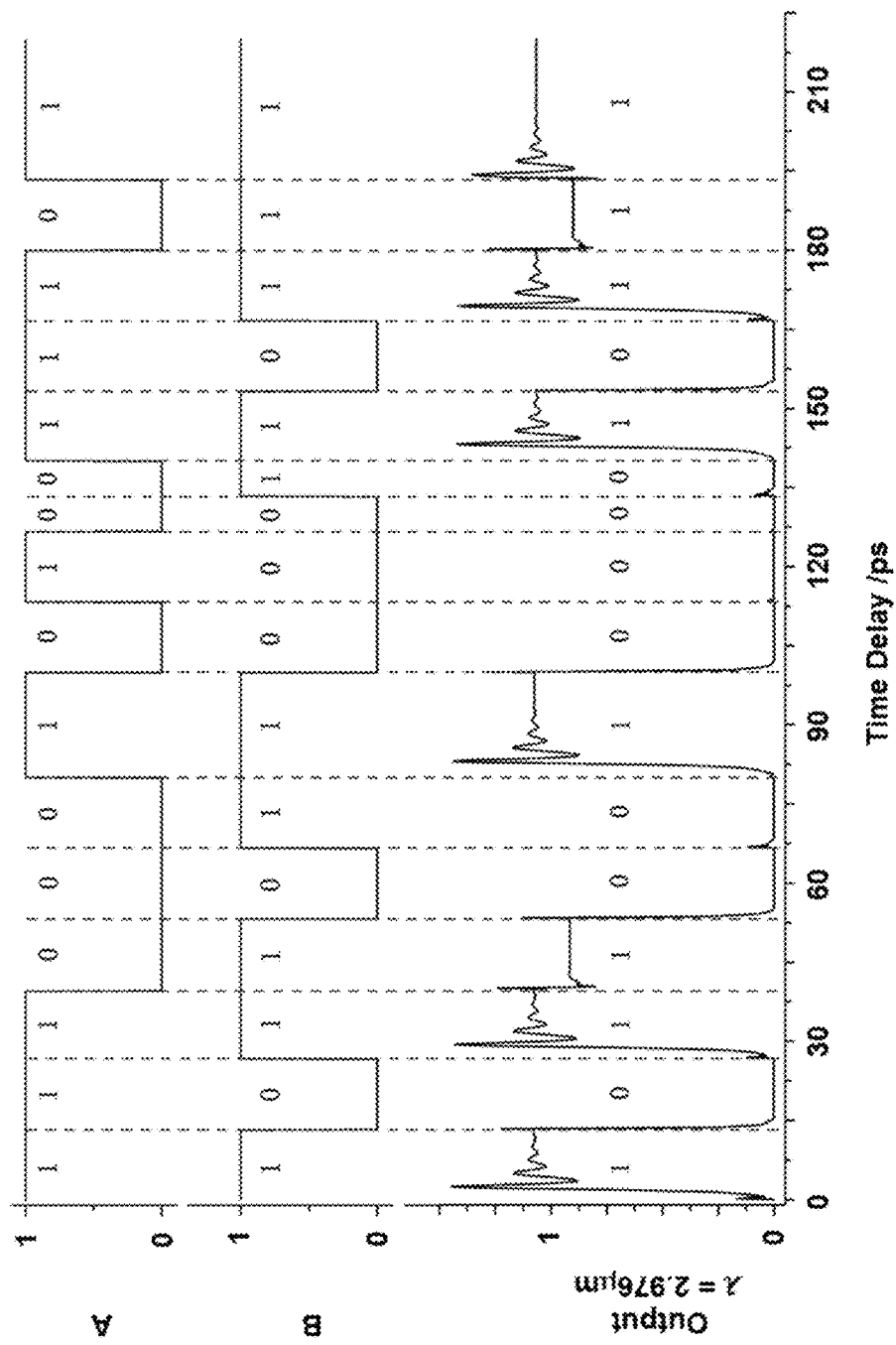
FIG. 2 is a waveform diagram of a basic logic function of the PhC structure unit shown in FIG. 1 for the lattice constant d of 1 μm and the operating wavelength of 2.976 μm.

For the lattice constant d of 1 μm and the operating wavelength of 2.976 μm, referring to the 2D PhC cross-waveguide nonlinear cavity 01 shown in FIG. 1, the clock-signal input port 21 and the intermediate signal-input port 22 are signal-input ports, a signal A is input from the clock-signal input port 21, and a signal B is input from the intermediate signal-input port 22. The lower part of FIG. 2 shows a logic output waveform diagram of the 2D PhC nonlinear cavity of the present invention for the input signal wave forms shown by the upper two diagrams in FIG. 2 input from the clock-signal input port 21 and the intermediate signal-input port 22. A logic operation truth table of the structure shown in FIG. 1 can be obtained according to the logic operation characteristic shown in FIG. 2, as illustrated in FIG. 5. In FIG. 5, C is current state $Q^n$, and Y is signal output of the output port (of the nonlinear cavity unit), i.e., next state $Q^{n+1}$. A logic expression of the nonlinear cavity unit can be obtained according to the truth table.

$$Y=AB+BC \quad (1)$$

That is $$Q^{n+1}=AB+BQ^n \quad (2)$$

The function of the all-optical synchronous D-type flip-flop can be realized by connection of unit devices according to the basic logic characteristic of the 2D PhC cross-waveguide nonlinear cavity under the optical switch and cooperation of the clock control signal CP. The operating steps are as follows:

For CP=0, the input signal A of the clock-signal input port 21 of the PhC structure unit 02 is synchronous with the CP, A=CP=0; simultaneously, the optical switch gates the input signal of the first signal-input port 11 and outputs it to the wave absorbing load 03 from the second intermediate signal-output port 14 of the optical switch unit 01; the optical switch gates the input signal of the second signal-input port 12 and outputs it from the first intermediate signal-output port 13 of the optical switch, and the input signal is shot to the intermediate signal-input port 22 of the PhC structure unit 02. Thus, the input signal of the intermediate signal-input port 22 of the PhC structure unit 02 is equal to the input signal of the second signal-input port 12.

For CP=1, the input signal A of the clock-signal input port 21 of the PhC structure unit 02 is synchronous with the CP, A=CP=1; simultaneously, the optical switch gates the input signal of the second signal-input port 12 and outputs it to the wave absorbing load 03 from the second intermediate signal-output port 14 of the optical switch; the optical switch gates the input signal of the first signal-input port 11 and outputs it from the first intermediate signal-output port 13 of the optical switch, and the input signal is shot to the intermediate signal-input port 22 of the PhC structure unit 02. Thus, the input signal of the intermediate signal-input port 22 of the PhC structure unit 02 is equal to the input signal of the first signal-input port 11.

Under connection and cooperation of said unit devices, the function of the all-optical synchronous D-type flip-flop can be realized by the control of the clock-signal CP of the clock-signal input port.

The PhC structure of the device of the present invention is a (2k+1)×(2k+1) array structure, where k is an integer more than or equal to 3. Two embodiments will be given below in combination with the accompanying drawings, and design and simulation results are given in the embodiments, taking an 11×11 array structure and lattice constant d which are respectively 1 μm and 0.5208 μm as an example.

For CP=1, the input signal A of the clock-signal input port 21 of the PhC structure unit 02 is synchronous with the clock control signal CP, A=CP=1; simultaneously, the reference-light E of the second signal-input port 12 of the optical selector switch 01 is output to the wave absorbing load 03 from the second intermediate signal-output port 14; the input logic signal D of the first signal-input port 11 of the optical selector switch 01 is output from the first intermediate signal-output port 13 of the optical selector switch 01 and shot to the intermediate signal-input port 22 of the PhC structure unit 02, i.e., the input signal B of the intermediate signal-input port 22 of the PhC structure unit 02 is equal to the D, and it can be obtained from formula (2):

$$Q^{n+1}=D \quad (3)$$

If D=1, $Q^{n+1}$=1; if D=0, $Q^{n+1}$=0; according to different value of the input signal D, the output of the system can be set to 1 or 0. The output signal 24 of the system will follow the logic input signal D.

For CP=0, the input signal A of the clock-signal input port 21 of the PhC structure unit 02 is synchronous with the clock control signal CP, A=CP=0; simultaneously, the logic signal D of the first signal-input port 11 of the optical selector switch 01 is output to the wave absorbing load 03 from the second intermediate signal-output port 14; the reference-light E of the second signal-input port 12 of the optical selector switch 01 is output from the first intermediate signal-output port 13 and shot to the intermediate signal-input port 22 of the PhC structure unit 02, i.e., the input signal B of the intermediate signal-input port 22 of the PhC structure unit 02 is equal to E and equal to 1, and it can be obtained from formula (2).

$$Q^{n+1}=Q^n \quad (4)$$

Hence, for CP=0, no matter how the signal D changes, the system latches the system output value of the last moment. That is, the system output signal 24 will latch the logic output quantity of the system at the last moment.

Embodiment 1

Figure 3:
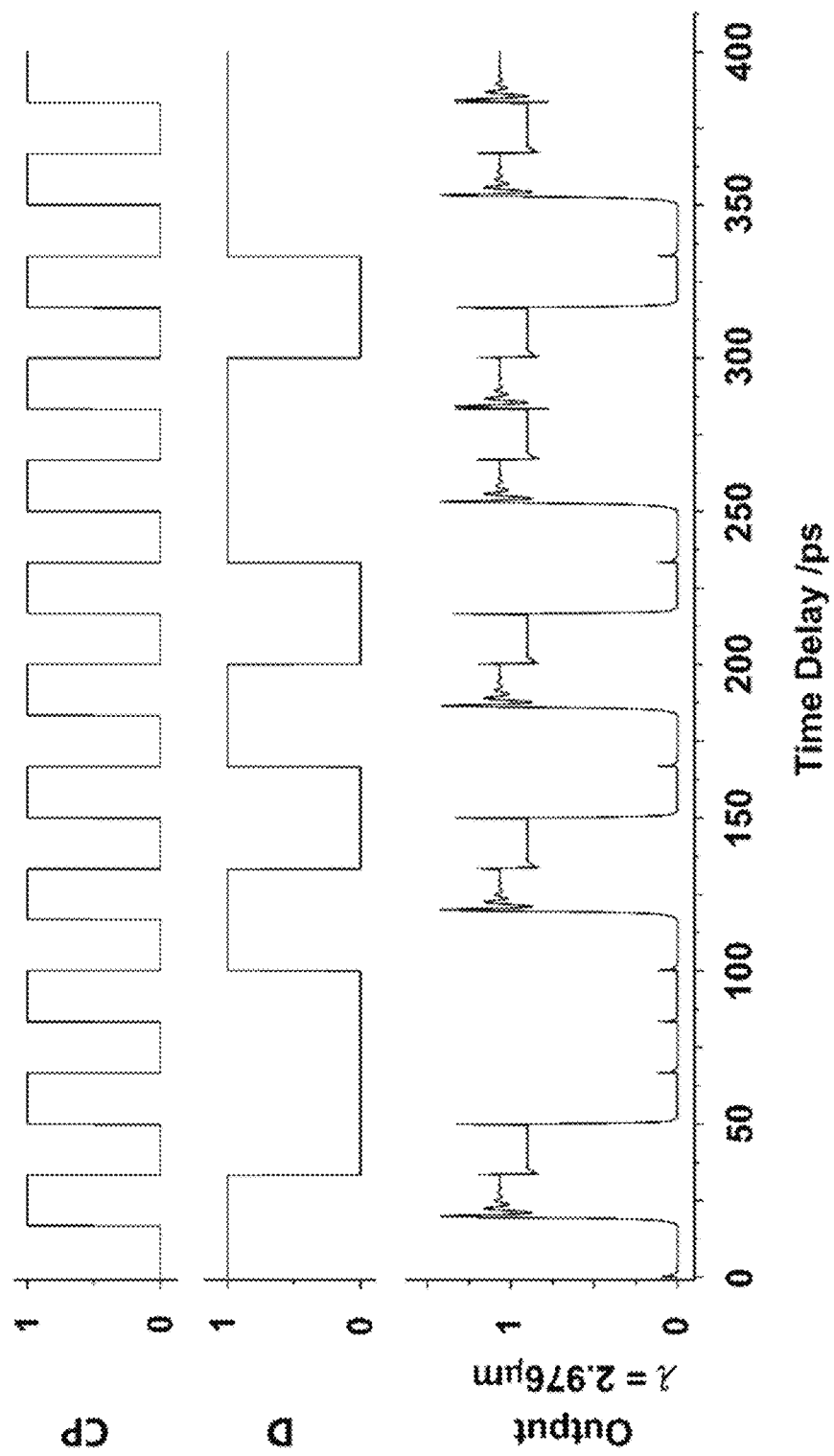
FIG. 3 is a waveform diagram of realizing the logic function of the all-optical synchronous D-type flip-flop of the present invention for the lattice constant d of 1 μm and the operating wavelength of 2.976 μm.

In combination with the above logic characteristic, for the lattice constant d of 1 μm and the operating wavelength of 2.976 μm, the circular high-refractive-index linear-dielectric pillar 25 is made of a silicon (Si) material and has the refractive index of 3.4 and the radius of 0.18 μm; the first rectangular high-refractive-index linear-dielectric pillar 26 has the refractive index of 3.4, long sides of 0.613 μm and short sides of 0.162 μm; the second rectangular high-refractive-index linear-dielectric pillar 27 has the dielectric constant consistent with that of the nonlinear-dielectric pillar in dark, and is as large as the first rectangular high-refractive-index linear-dielectric pillar 26; the central nonlinear-dielectric pillar 28 is made of a Kerr type nonlinear material, and has the side length of 1.5 µm, the dielectric constant of 7.9 in dark and the third-order nonlinear coefficient of $1.33\times10^{-2}$ µm$^2$/V$^2$; and the distance between every two adjacent rectangular linear-dielectric pillars is 0.2668 µm. As shown in FIG. 3, under said dimension parameter, it is supposed that D inputs the signal waveform as the figure, a system output waveform diagram at the lower part of the figure can be obtained. Hence, the output of the system follows the D signal for CP=1, and latches the output signal at the last moment for CP=0.

Embodiment 2

Figure 4:
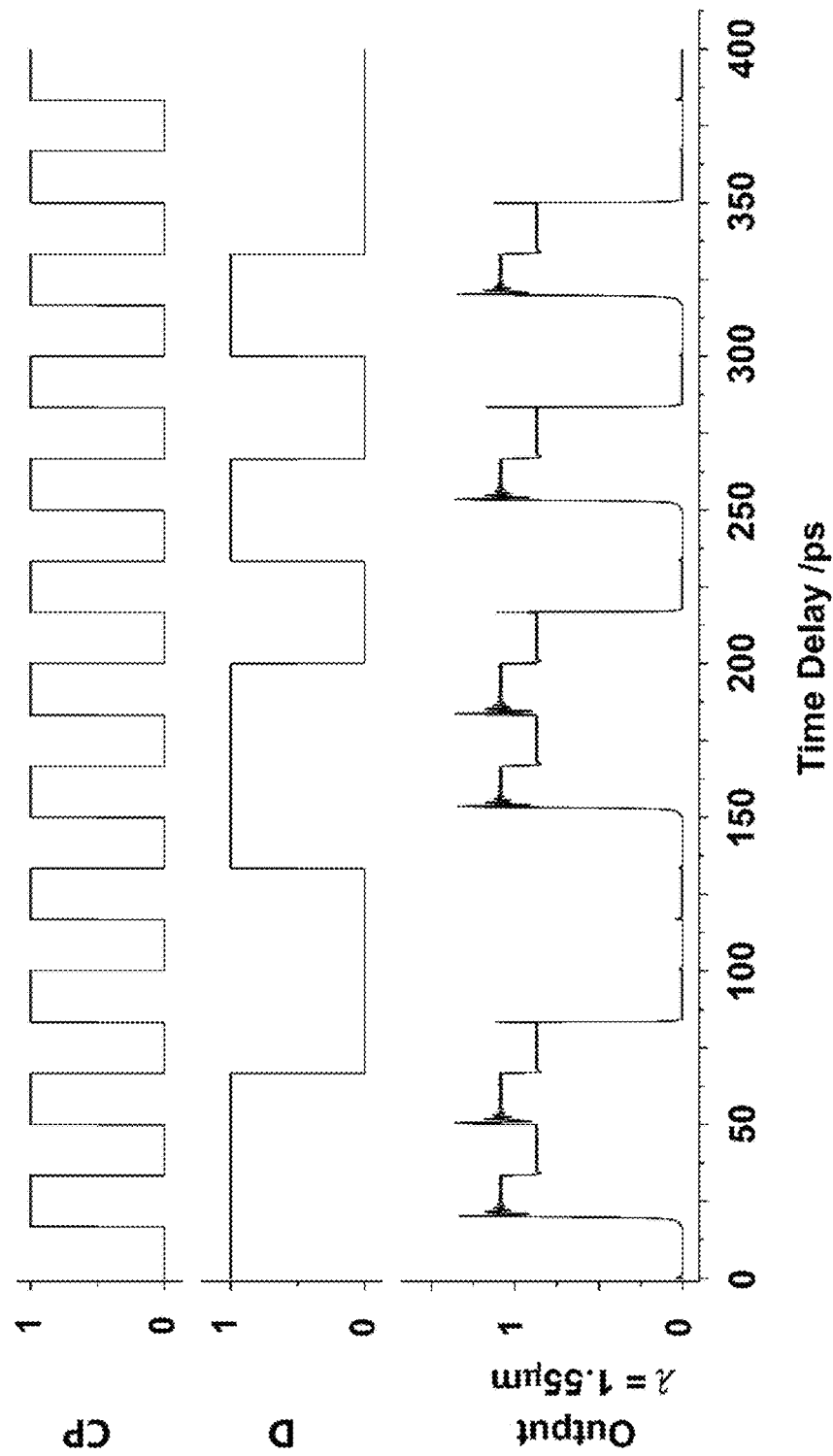
FIG. 4 is a waveform diagram of realizing the logic function of the all-optical synchronous D-type flip-flop of the present invention for the lattice constant d of 0.5208 μm and the operating wavelength of 1.55 μm.

For the lattice constant d of 0.5208 µm and the operating wavelength of 1.55 µm, the circular high-refractive-index linear-dielectric pillar 25 has a radius of 0.093744 µm; the first rectangular high-refractive-index linear-dielectric pillar 26 has the long sides of 0.3192504 µm and short sides of 0.0843696 µm; the second rectangular high-refractive-index linear-dielectric pillar 27 has a dimension equal to that of the first rectangular high-refractive-index linear-dielectric pillar 26; the central nonlinear-dielectric pillar 28 is side length of 0.7812 µm, and the third-order nonlinear coefficient of $1.33\times10^{-2}$ µm$^2$V$^2$; and the distance between every two adjacent rectangular linear-dielectric pillars is 0.13894944 µm. FIG. 4, under said dimension parameter, it is supposed that D inputs the signal waveform as the figure, a system output waveform diagram at the lower part of the figure can be obtained. It can be known from the logic relation between the input and the output shown in FIG. 4 that the present invention can also realize the same logic characteristic as in embodiment 1 by scaling: under the control of the clock-signal CP, the output of the system follows the D signal for CP=1, and latches the output signal at the last moment for CP=0.

Hence, the device of the present invention can realize the same logic function by scaling under different lattice constants and corresponding operating wavelengths, and the logic function conforms to the logic characteristic of the synchronous D-type flip-flop.

While the invention has been described in terms of various specific embodiments, those skilled in the art will recognize that the invention can be practiced with modification within the spirit and scope of the claims.

What is claimed is:

1. A photonic crystal (PhC) all-optical D-type flip-flop, wherein said PhC all-optical D-type flip-flop, comprising:
an optical switch unit, a PhC structure unit, a wave absorbing load and a reference-light source; said PhC structure unit includes two signal-input ends, a signal-output end and an idle port; a first port of said PhC structure unit is a clock signal-input port, and said clock signal-input port is connected with a clock control signal CP; a second port of the PhC structure unit is an intermediate signal-input port, said intermediate signal-input end is connected with a first intermediate signal-output end of said optical selector switch; a logic signal D is connected with the first signal-input end of said optical switch unit; said absorbing load is connected with a second intermediate signal-output end of the optical switch unit; said reference-light source is connected with a second signal-input end of the optical switch unit; said second signal-input end is a reference-light input end, said reference-light input end is connected with the output end of said reference-light source.

2. The PhC all-optical D-type flip-flop of claim 1, wherein said PhC structure unit is a two-dimensional (2D) PhC nonlinear cavity, and a center of said 2D PhC cross-waveguide nonlinear cavity is formed by arranging twelve rectangular high-refractive-index linear-dielectric pillars and one square nonlinear-dielectric pillar in a quasi-one-dimensional (1D) PhC manner in a longitudinal waveguide direction and a transverse waveguide direction, the central square nonlinear-dielectric pillar attaches to four adjacent rectangular linear-dielectric pillars, said central square nonlinear-dielectric pillar is made of a Kerr type nonlinear material, and has a dielectric constant of 7.9 under low-light-power conditions, a second rectangular high-refractive-index linear-dielectric pillar has said dielectric constant consistent with that of said nonlinear-dielectric pillar under low-light-power conditions.

3. The PhC all-optical D-type flip-flop of claim 1, wherein said high-refractive-index linear-dielectric pillars of said nonlinear cavity unit includes a 2D PhC cross intersected waveguide four-port network, two mutually-orthogonal quasi-1D PhC structures are placed in two waveguide directions crossed at said center of across waveguide, said dielectric pillar is arranged in a middle of said cross waveguide, said dielectric pillar is made of a nonlinear material, and said quasi-1D PhC structures and said dielectric pillar constitute a waveguide defect cavity.

4. The PhC all-optical D-type flip-flop of claim 1, wherein said PhC is a (2k+1)×(2k+1) array structure, where k is an integer more than or equal to 3.

5. The PhC all-optical D-type flip-flop of claim 1, wherein said optical switch unit is a 2×2 optical selector switch, including a clock control signal CP, a first signal-input end, a second signal-input end, a first intermediate signal-output end and a second intermediate signal-output end; said first signal-input end is system signal-input end; said second signal-input end is reference-light input end.

6. The PhC all-optical D-type flip-flop of claim 2, wherein a cross section of the high-refractive-index linear-dielectric pillar of said 2D PhC is circular, elliptic, triangular or polygonal.

7. The PhC all-optical D-type flip-flop of claim 3, wherein said dielectric pillar in the quasi-1D PhC of said cross waveguide has a refractive index of 3.4 or a different value more than 2.

8. The PhC all-optical D-type flip-flop of claim 3, wherein the cross section of said central dielectric pillar is square, polygonal, circular or elliptic.

9. The PhC all-optical D-type flip-flop of claim 3, wherein the cross section of said dielectric pillar in the quasi-1D PhC of said cross waveguide is rectangular, polygonal circular or elliptic.

10. The PhC all-optical D-type flip-flop of claim 1, wherein a background filling material for said 2D PhC includes air or a different low-refractive-index dielectric having a refractive index less than 1.4.

* * * * *